(12) United States Patent
Syu

(10) Patent No.: US 11,604,334 B2
(45) Date of Patent: Mar. 14, 2023

(54) LENS ASSEMBLY

(71) Applicants: Sintai Optical (Shenzhen) Co., Ltd., ShenZhen (CN); Asia Optical Co., Inc., Taichung (TW)

(72) Inventor: Rong-Shun Syu, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 471 days.

(21) Appl. No.: 16/798,770

(22) Filed: Feb. 24, 2020

(65) Prior Publication Data

US 2020/0301108 A1 Sep. 24, 2020

(30) Foreign Application Priority Data

Mar. 21, 2019 (CN) .......................... 201910217203.9

(51) Int. Cl.
*G02B 13/00* (2006.01)
*G02B 9/34* (2006.01)
*G02B 13/18* (2006.01)
G02B 27/00 (2006.01)
G02B 5/00 (2006.01)

(52) U.S. Cl.
CPC ............. *G02B 13/004* (2013.01); *G02B 9/34* (2013.01); *G02B 13/18* (2013.01); G02B 5/005 (2013.01); G02B 27/0025 (2013.01)

(58) Field of Classification Search
CPC ........ G02B 13/004; G02B 9/34; G02B 13/18; G02B 5/005; G02B 27/0025
USPC .......................... 359/715, 717, 740, 771–773
See application file for complete search history.

(56) References Cited

U.S. PATENT DOCUMENTS

| | | | | |
|---|---|---|---|---|
| 9,001,436 | B2* | 4/2015 | Tsai | G02B 13/18 |
| | | | | 359/773 |
| 9,030,760 | B2* | 5/2015 | Liao | G02B 9/34 |
| | | | | 359/715 |
| 9,703,079 | B1* | 7/2017 | Teraoka | G02B 5/005 |
| 11,112,579 | B2* | 9/2021 | Liu | G02B 13/004 |
| 11,314,043 | B2* | 4/2022 | Fu | G02B 9/62 |

(Continued)

FOREIGN PATENT DOCUMENTS

| | | |
|---|---|---|
| CN | 101320123 A | 12/2008 |
| CN | 105700120 A | 6/2016 |

(Continued)

*Primary Examiner* — Evelyn A Lester
(74) *Attorney, Agent, or Firm* — McClure, Qualey & Rodack, LLP

(57) ABSTRACT

A lens assembly includes a front lens group and a rear lens group. The front lens group includes a first lens having positive refractive power and a second lens having negative refractive power. The rear lens group includes a third lens having positive refractive power and a fourth lens having negative refractive power, wherein the third lens includes a convex surface facing an object side and another convex surface facing an image side and the fourth lens includes a concave surface facing the image side. The first lens, the second lens, the third lens, and the fourth lens are arranged in order from the object side to the image side along an optical axis. The lens assembly satisfies: 13.5 mm<f+$f_1$<20 mm; wherein f is an effective focal length of the lens assembly and $f_1$ is an effective focal length of the first lens.

19 Claims, 12 Drawing Sheets

(56) References Cited

U.S. PATENT DOCUMENTS

| | | | |
|---|---|---|---|
| 11,409,076 B2* | 8/2022 | Zhao | G02B 9/34 |
| 2004/0136097 A1 | 7/2004 | Park | |
| 2007/0242370 A1 | 10/2007 | Fukuta et al. | |
| 2013/0044379 A1* | 2/2013 | Hsieh | G02B 13/004 |
| | | | 359/715 |
| 2013/0208365 A1 | 8/2013 | Hsu et al. | |
| 2015/0153543 A1* | 6/2015 | Chen | G03B 13/32 |
| | | | 359/772 |
| 2015/0153545 A1* | 6/2015 | Chen | G02B 9/34 |
| | | | 359/771 |
| 2015/0219877 A1* | 8/2015 | Zhao | G02B 13/004 |
| | | | 359/715 |
| 2015/0260950 A1* | 9/2015 | Chen | G02B 13/004 |
| | | | 359/771 |
| 2015/0331222 A1* | 11/2015 | Yang | G02B 13/004 |
| | | | 359/715 |
| 2015/0331223 A1* | 11/2015 | Kuo | G02B 13/004 |
| | | | 359/715 |
| 2015/0370039 A1* | 12/2015 | Bone | G02B 13/14 |
| | | | 359/715 |
| 2015/0378129 A1* | 12/2015 | Yuza | G02B 13/004 |
| | | | 359/715 |
| 2016/0062080 A1* | 3/2016 | Yuza | G02B 13/004 |
| | | | 359/715 |
| 2016/0116706 A1* | 4/2016 | Hsu | G02B 13/004 |
| | | | 359/715 |
| 2016/0116707 A1* | 4/2016 | Chen | H04N 5/2254 |
| | | | 359/740 |
| 2016/0131868 A1* | 5/2016 | Hsu | G02B 13/004 |
| | | | 359/715 |
| 2016/0147046 A1* | 5/2016 | Hsieh | G02B 9/34 |
| | | | 359/715 |
| 2016/0161708 A1* | 6/2016 | Jang | G02B 13/004 |
| | | | 359/715 |
| 2016/0182779 A1* | 6/2016 | Yeh | G02B 13/0015 |
| | | | 359/771 |
| 2017/0269332 A1* | 9/2017 | Jhang | G02B 9/60 |

FOREIGN PATENT DOCUMENTS

| | | |
|---|---|---|
| CN | 109459834 A | 3/2019 |
| JP | 2007218947 A | 8/2007 |
| TW | 201109716 A | 3/2011 |

* cited by examiner

LENS ASSEMBLY

CROSS REFERENCE TO RELATED APPLICATIONS

This application claims priority of China Patent Application No. 201910217203.9, filed on Mar. 21, 2019, the entirety of which is incorporated by reference herein.

BACKGROUND OF THE INVENTION

Field of the Invention

The invention relates to a lens assembly.

Description of the Related Art

The current development trend of a lens assembly is toward miniaturization. Additionally, the lens assembly is developed to have light weight and high resolution in accordance with different application requirements. However, the known lens assembly can't satisfy such requirements. Therefore, the lens assembly needs a new structure in order to meet the requirements of miniaturization, light weight, and high resolution at the same time.

BRIEF SUMMARY OF THE INVENTION

The invention provides a lens assembly to solve the above problems. The lens assembly of the invention is provided with characteristics of a shortened total lens length, a reduced weight, an increased resolution, and still has a good optical performance.

The lens assembly in accordance with an exemplary embodiment of the invention includes a front lens group and a rear lens group. The front lens group includes a first lens having positive refractive power and a second lens having negative refractive power. The rear lens group includes a third lens having positive refractive power and a fourth lens having negative refractive power, wherein the third lens includes a convex surface facing an object side and another convex surface facing an image side and the fourth lens includes a concave surface facing the image side. The first lens, the second lens, the third lens, and the fourth lens are arranged in order from the object side to the image side along an optical axis. The lens assembly satisfies: 13.5 mm<f+$f_1$<20 mm; wherein f is an effective focal length of the lens assembly and $f_1$ is an effective focal length of the first lens.

The lens assembly in accordance with another exemplary embodiment of the invention includes a front lens group and a rear lens group. The front lens group includes a first lens having positive refractive power and a second lens having negative refractive power. The rear lens group includes a third lens having positive refractive power and a fourth lens having negative refractive power, wherein the third lens includes a convex surface facing an object side and another convex surface facing an image side and the fourth lens includes a concave surface facing the image side. The first lens, the second lens, the third lens, and the fourth lens are arranged in order from the object side to the image side along an optical axis. The lens assembly satisfies: 60<$Vd_3$+$Vd_4$<80; wherein $Vd_3$ is an Abbe number of the third lens and $Vd_4$ is an Abbe number of the fourth lens.

In another exemplary embodiment, the lens assembly satisfies: 9.5 mm<f+$f_3$<13 mm; 2 mm<f+$f_4$<4 mm; wherein f is an effective focal length of the lens assembly, $f_3$ is an effective focal length of the third lens, and $f_4$ is an effective focal length of the fourth lens.

In yet another exemplary embodiment, the lens assembly satisfies: 60<$Vd_3$+$Vd_4$<80; 0.5<f/TTL<0.8; wherein $Vd_3$ is an Abbe number of the third lens, $Vd_4$ is an Abbe number of the fourth lens, f is an effective focal length of the lens assembly, and TTL is an interval from an object side surface of the first lens to an image plane along the optical axis.

In another exemplary embodiment, the lens assembly satisfies: 0.1<|f/$f_F$|<0.6; 0.2<|($f_R$−f)/f|<1.5; wherein f is an effective focal length of the lens assembly, $f_F$ is an effective focal length of the front lens group, and $f_R$ is an effective focal length of the rear lens group.

In yet another exemplary embodiment, the lens assembly satisfies: 0.1<|$f_R$/$f_F$|<1.5; wherein $f_F$ is an effective focal length of the front lens group and $f_R$ is an effective focal length of the rear lens group.

In another exemplary embodiment, the lens assembly further includes a stop disposed between the front lens group and the rear lens group, and the lens assembly is a fixed-focus lens assembly.

In yet another exemplary embodiment, the second lens includes a concave surface facing the object side and another concave surface facing the image side and the fourth lens further includes a concave surface facing the object side.

In another exemplary embodiment, the first lens includes a convex surface facing the object side and another convex surface facing the image side.

In yet another exemplary embodiment, the first lens includes a convex surface facing the object side and a concave surface facing the image side.

In another exemplary embodiment, the front lens group includes an aspheric lens and the rear lens group includes an aspheric lens.

In yet another exemplary embodiment, the lens assembly satisfies: 0.5<f/TTL<0.8; 0.1<|f/$f_F$|<0.6; 0.2<|($f_R$−f)/f|<1.5; 0.1<|$f_R$/$f_F$|<1.5; wherein f is an effective focal length of the lens assembly, $f_F$ is an effective focal length of the front lens group, $f_R$ is an effective focal length of the rear lens group, and TTL is an interval from the convex surface of the first lens to an image plane along the optical axis.

In another exemplary embodiment, the first lens includes a convex surface facing the object side and a concave surface facing the image side, the second lens includes a concave surface facing the object side and another concave surface facing the image side, and the fourth lens further includes a concave surface facing the object side.

In yet another exemplary embodiment, the first lens includes a convex surface facing the object side and another convex surface facing the image side, the second lens includes a concave surface facing the object side and another concave surface facing the image side, and the fourth lens further includes a concave surface facing the object side.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

The present invention provides a lens assembly including a front lens group and a rear lens group. The front lens group includes a first lens having positive refractive power and a second lens having negative refractive power. The rear lens group includes a third lens having positive refractive power and a fourth lens having negative refractive power, wherein the third lens includes a convex surface facing an object side and another convex surface facing an image side and the fourth lens includes a concave surface facing the image side. The first lens, the second lens, the third lens, and the fourth lens are arranged in order from the object side to the image side along an optical axis. The lens assembly satisfies: 13.5 mm<f+f$_1$<20 mm; wherein f is an effective focal length of the lens assembly and f$_1$ is an effective focal length of the first lens.

The present invention provides another lens assembly including a front lens group and a rear lens group. The front lens group includes a first lens having positive refractive power and a second lens having negative refractive power. The rear lens group includes a third lens having positive refractive power and a fourth lens having negative refractive power, wherein the third lens includes a convex surface facing an object side and another convex surface facing an image side and the fourth lens includes a concave surface facing the image side. The first lens, the second lens, the third lens, and the fourth lens are arranged in order from the object side to the image side along an optical axis. The lens assembly satisfies: 60<Vd$_3$+Vd$_4$<80; wherein Vd$_3$ is an Abbe number of the third lens and Vd is an Abbe number of the fourth lens.

Referring to Table 1, Table 2, Table 4, Table 5, Table 7, and Table 8, wherein Table 1, Table 4, and Table 7 show optical specifications in accordance with a first, second, and third embodiments of the invention respectively and Table 2, Table 5, and Table 8 show aspheric coefficients of each aspheric lens in Table 1, Table 4, and Table 7 respectively.

Figure 1:
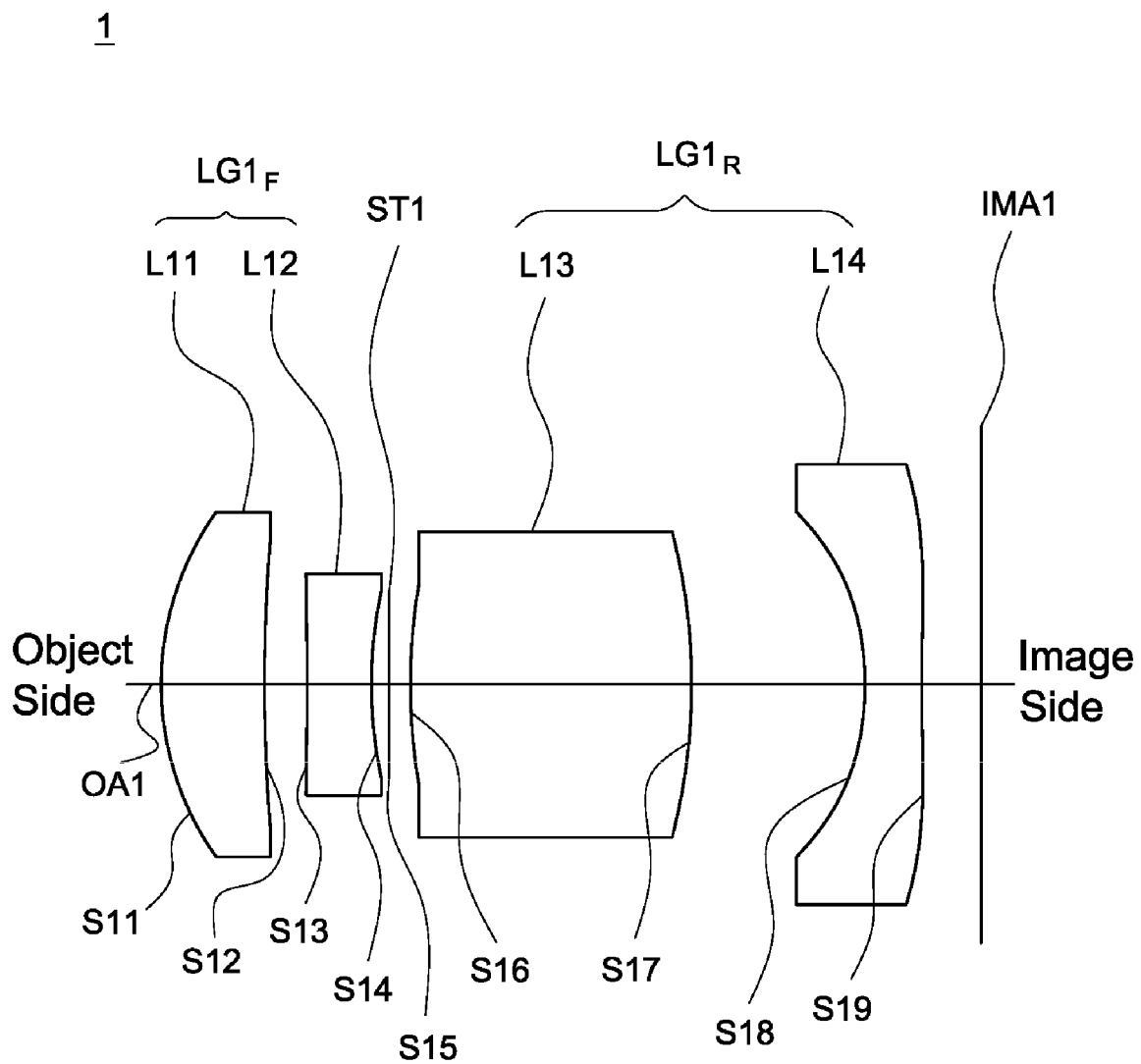
FIG. 1 is a lens layout diagram of a lens assembly in accordance with a first embodiment of the invention.
Figure 3:
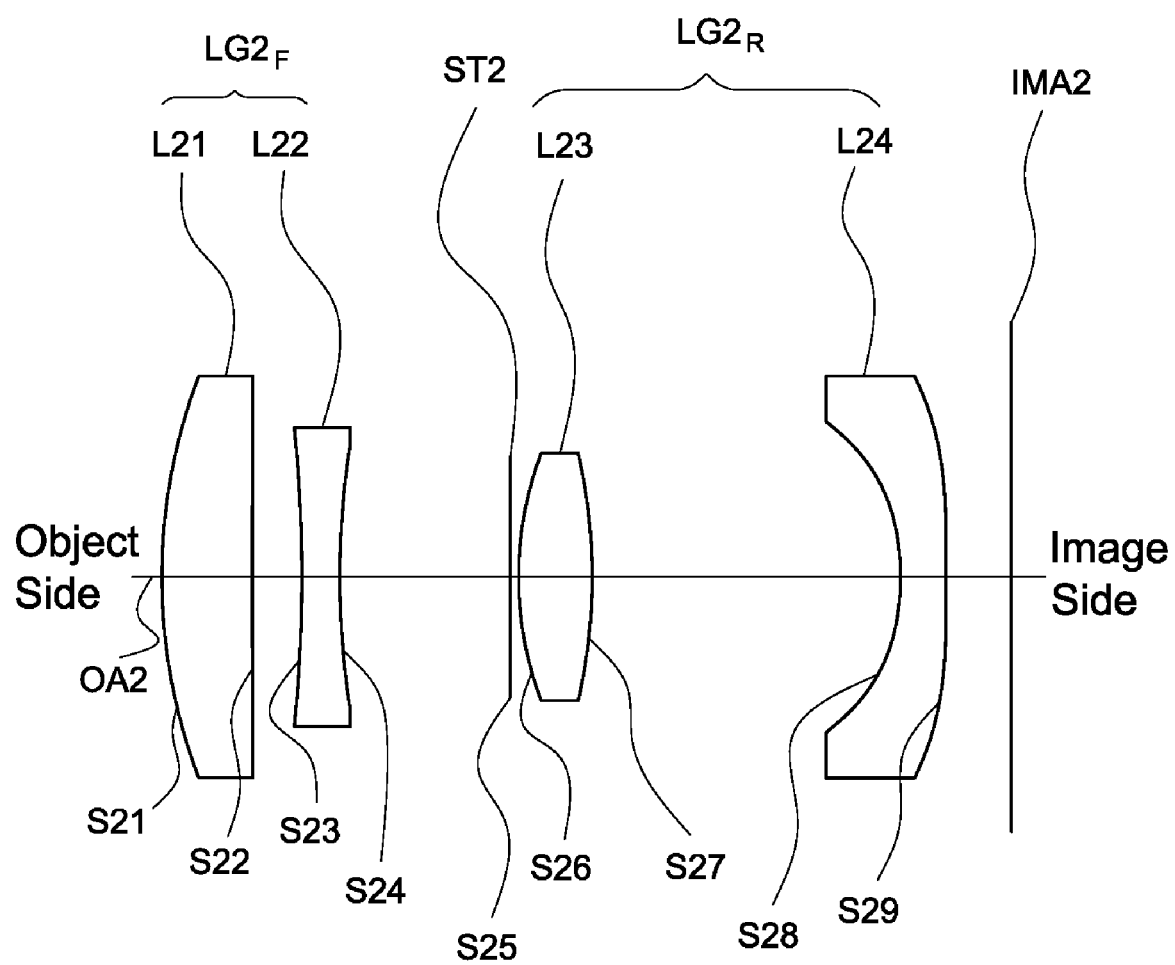
FIG. 3 is a lens layout diagram of a lens assembly in accordance with a second embodiment of the invention.
Figure 5:
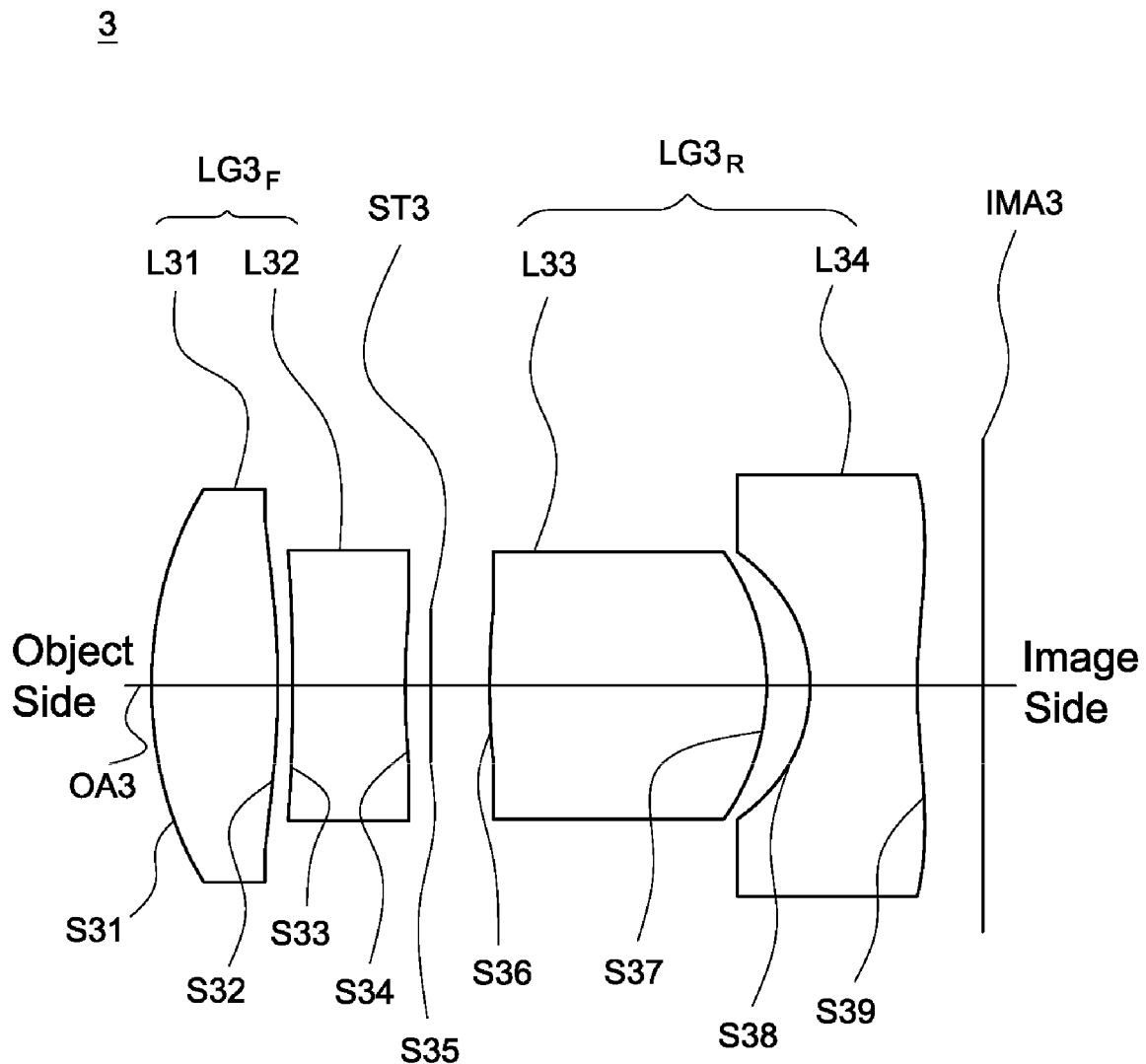
FIG. 5 is a lens layout diagram of a lens assembly in accordance with a third embodiment of the invention.

FIG. 1, FIG. 3, and FIG. 5 are lens layout diagrams of the lens assemblies in accordance with the first, second, and third embodiments of the invention respectively. The front lens groups LG1$_F$, LG2$_F$, LG3$_F$ include the first lenses L11, L21, L31 and the second lenses L12, L22, L32 respectively. The rear lens groups LG1$_R$, LG2$_R$, LG3$_R$ include the third lenses L13, L23, L33 and the fourth lenses L14, L24, L34 respectively.

The first lenses L11, L21, L31 are with positive refractive power and made of plastic material, wherein the object side surfaces S11, S21, S31 and the image side surfaces S12, S22, S32 are aspheric surfaces.

The second lenses L12, L22, L32 are with negative refractive power and made of plastic material, wherein the object side surfaces S13, S23, S33 and the image side surfaces S14, S24, S34 are aspheric surfaces.

The third lenses L13, L23, L33 are with positive refractive power and made of plastic material, wherein the object side surfaces S16, S26, S36 are convex surfaces and the image side surfaces S17, S27, S37 are convex surfaces.

The fourth lenses L14, L24, L34 are with negative refractive power and made of plastic material, wherein the image side surfaces S19, S29, S39 are concave surfaces and the object side surfaces S18, S28, S38 and the image side surfaces S19, S29, S39 are aspheric surfaces.

In addition, the lens assemblies 1, 2, 3 satisfy at least one of the following conditions:

$$13.5 \text{ mm} < f+f_1 < 20 \text{ mm}; \quad (1)$$

$$9.5 \text{ mm} < f+f_3 < 13 \text{ mm}; \quad (2)$$

$$2 \text{ mm} < f+f_4 < 4 \text{ mm}; \quad (3)$$

$$60 < Vd_3 + Vd_4 < 80; \quad (4)$$

$$0.5 < f/TTL < 0.8; \quad (5)$$

$$0.1 < f/f_F < 0.6; \quad (6)$$

$$0.2 < |(f_R - f)/f| < 1.5; \quad (7)$$

$$0.1 < f_R/f_F < 1.5; \quad (8)$$

wherein f is an effective focal length of the lens assemblies 1, 2, 3 for the first to third embodiments, f$_1$ is an effective focal length of the first lenses L11, L21, L31 for the first to third embodiments, f$_3$ is an effective focal length of the third lenses L3, L23, L33 for the first to third embodiments, f$_4$ is an effective focal length of the fourth lenses L14, L24, L34 for the first to third embodiments, Vd$_3$ is an Abbe number of the third lenses L13, L23, L33 for the first to third embodiments, Vd$_4$ is an Abbe number of the fourth lenses L14, L24, L34 for the first to third embodiments, TTL is an interval from the object side surfaces S11, S21, S31 of the first lenses L11, L21, L31 to the image planes IMA1, IMA2, IMA3 along the optical axises OA1, OA2, OA3 for the first to third embodiments, f$_F$ is an effective focal length of the front lens groups LG1$_F$, LG2$_F$, LG3$_F$ for the first to third embodiments, and f$_R$ is an effective focal length of the rear lens groups LG1$_R$, LG2$_R$, LG3$_R$ for the first to third embodiments. With the lens assemblies 1, 2, 3 satisfying at least one of the above conditions (1)-(8), the total lens length can be effectively shortened, the weight can be effectively reduced, the resolution can be effectively increased, the chromatic aberration can be effectively corrected, and the aberration can be effectively corrected.

A detailed description of a lens assembly in accordance with a first embodiment of the invention is as follows.

Referring to FIG. 1, the lens assembly 1 includes a front lens group $LG1_F$, a stop ST1, and a rear lens group $LG1_R$, all of which are arranged in order from an object side to an image side along an optical axis OA1. The front lens group $LG1_F$ includes a first lens L11 and a second lens L12. The rear lens group $LG1_R$ includes a third lens L13 and a fourth lens L14.

In operation, an image of light rays from the object side is formed at an image plane IMA1. The lens assembly 1 is a fixed-focus lens assembly, wherein the front lens group $LG1_F$, the stop ST1, and the rear lens group $LG1_R$ can be moved along the optical axis OA1 for focusing.

As described above, wherein: the first lens L11 is a meniscus lens, wherein the object side surface S11 is a convex surface and the image side surface S12 is a concave surface; the second lens L12 is a biconcave lens, wherein the object side surface S13 is a concave surface and the image side surface S14 is a concave surface; the third lens L13 is a biconvex lens, wherein the object side surface S16 and the image side surface S17 are spherical surfaces; and the fourth lens L14 is a biconcave lens, wherein the object side surface S18 is a concave surface.

With the above design of the lenses and stop ST1 and at least any one of the conditions (1)-(8) satisfied, the lens assembly 1 can have an effective shortened total lens length, an effective reduced weight, an effective increased resolution, an effective corrected chromatic aberration, and is capable of an effective corrected aberration.

Table 1 shows the optical specification of the lens assembly 1 in FIG. 1.

TABLE 1

Effective Focal Length = 7.3848 mm F-number = 2.4
Total Lens Length = 10.4273 mm Field of View = 47.004 Degrees

| Surface Number | Radius of Curvature (mm) | Thickness (mm) | Nd | Vd | Effective Focal Length (mm) | Remark |
|---|---|---|---|---|---|---|
| S11 | 3.87 | 1.31 | 1.53 | 55 | 8.19 | The First Lens L11 |
| S12 | 31.41 | 0.54 | | | | |
| S13 | −109.35 | 0.82 | 1.66 | 20 | −8.17 | The Second Lens L12 |
| S14 | 5.69 | 0.22 | | | | |
| S15 | ∞ | 0.27 | | | | Stop ST1 |
| S16 | 7.49 | 3.58 | 1.80 | 40 | 5.24 | The Third Lens L13 |
| S17 | −7.49 | 2.20 | | | | |
| S18 | −3.86 | 0.72 | 1.63 | 24 | −5.14 | The Fourth Lens L14 |
| S19 | 21.57 | 0.76 | | | | |

The aspheric surface sag z of each aspheric lens in table 1 can be calculated by the following formula:

$$z = ch^2/\{1+[1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the first embodiment, the conic constant k and the aspheric coefficients A, B, C, D, E of each aspheric lens are shown in Table 2.

TABLE 2

| Surface Number | k | A | B | C | D | E |
|---|---|---|---|---|---|---|
| S11 | −1.32E−02 | 6.68E−04 | 1.38E−04 | 0.00E+00 | −1.32E−02 | 0.00E+00 |
| S12 | 0.00E+00 | 3.06E−03 | −1.81E−04 | −3.81E−05 | 0.00E+00 | 0.00E+00 |
| S13 | 0.00E+00 | −3.63E−04 | −6.27E−04 | −3.16E−05 | 0.00E+00 | 0.00E+00 |
| S14 | 0.00E+00 | 2.54E−04 | −2.26E−04 | 0.00E+00 | 0.00E+00 | 0.00E+00 |
| S18 | −1.40E+00 | −1.54E−02 | 2.48E−04 | 1.75E−04 | −1.92E−05 | −1.40E+00 |
| S19 | 0.00E+00 | −9.70E−03 | 5.88E−04 | −2.02E−05 | 0.00E+00 | 0.00E+00 |

Table 3 shows the parameters and condition values for conditions (1)-(8) in accordance with the first embodiment of the invention. It can be seen from Table 3 that the lens assembly 1 of the first embodiment satisfies the conditions (1)-(8).

TABLE 3

| $f_F$ | 34.78 mm | $f_R$ | 8.127 mm | | |
|---|---|---|---|---|---|
| $f + f_1$ | 15.57 mm | $f + f_3$ | 12.62 mm | $f + f_4$ | 2.24 mm |
| $Vd_3 + Vd_4$ | 64 | f/TTL | 0.71 | $|f/f_F|$ | 0.21 |
| $|(f_R - f)/f|$ | 0.10 | $|f_R/f_F|$ | 0.23 | | |

Figure 2A:
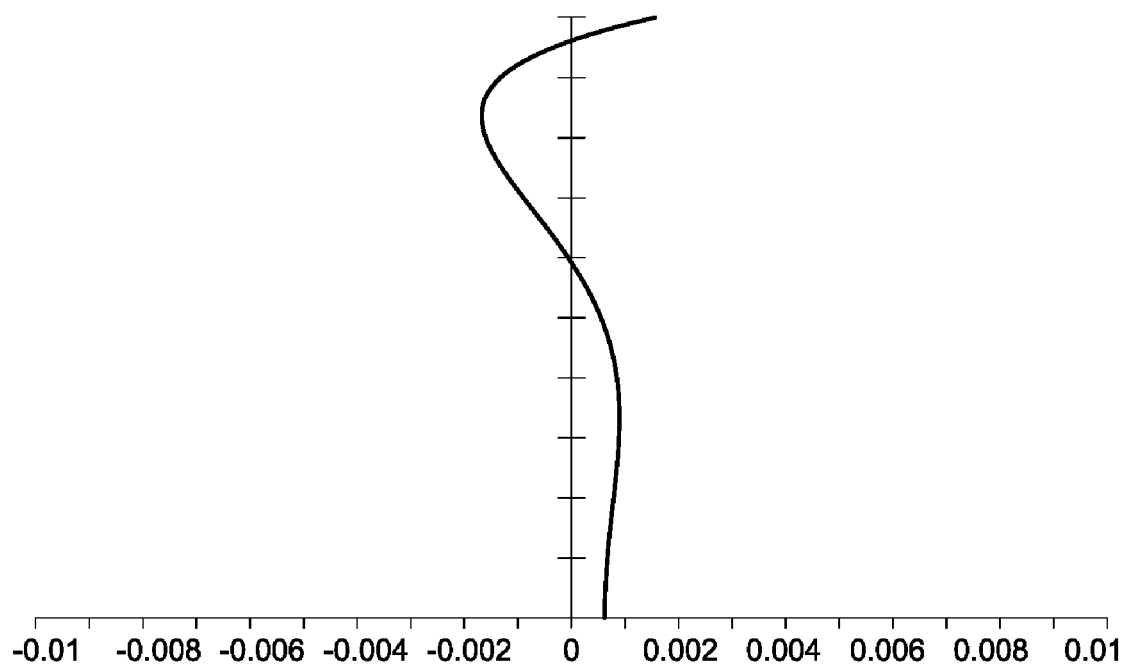
FIG. 2A depicts a longitudinal aberration diagram of the lens assembly in accordance with the first embodiment of the invention.
Figure 2B:
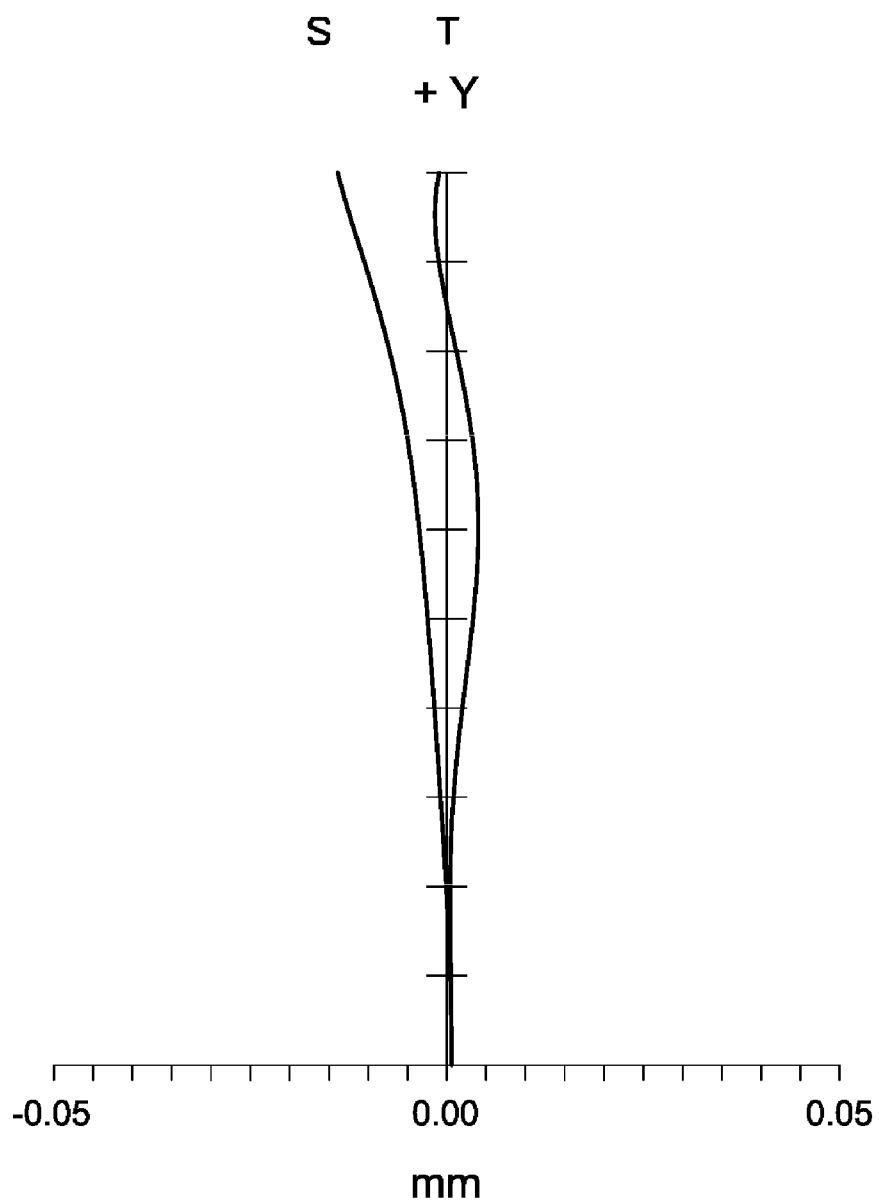
FIG. 2B is a field curvature diagram of the lens assembly in accordance with the first embodiment of the invention.
Figure 2C:
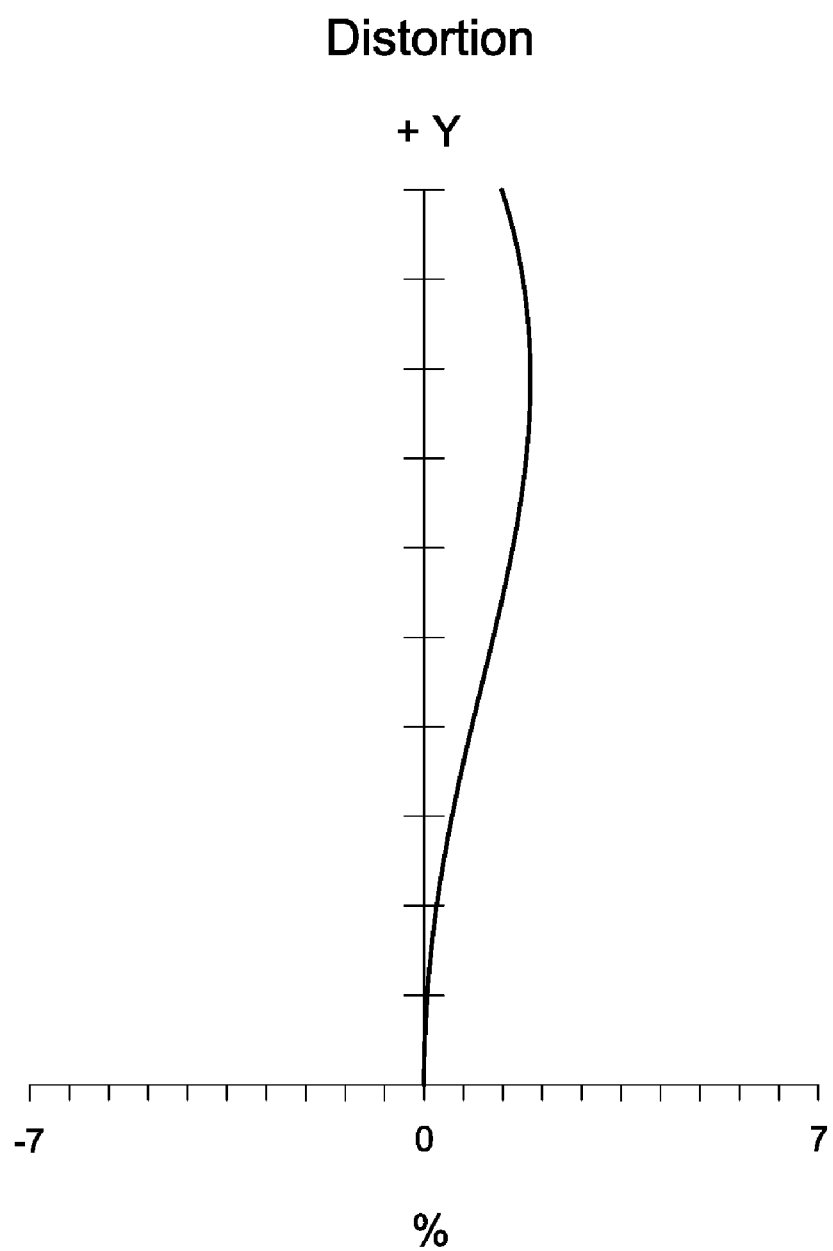
FIG. 2C is a distortion diagram of the lens assembly in accordance with the first embodiment of the invention.

By the above arrangements of the lenses and stop ST1, the lens assembly 1 of the first embodiment can meet the requirements of optical performance as seen in FIGS. 2A-2C.

It can be seen from FIG. 2A that the longitudinal aberration in the lens assembly 1 of the first embodiment ranges from −0.002 mm to 0.002 mm.

It can be seen from FIG. 2B that the field curvature of tangential direction and sagittal direction in the lens assembly 1 of the first embodiment ranges from −0.015 mm to 0.005 mm.

It can be seen from FIG. 2C that the distortion in the lens assembly 1 of the first embodiment ranges from 0% to 2.1%.

It is obvious that the longitudinal aberration, the field curvature, and the distortion of the lens assembly 1 of the first embodiment can be corrected effectively. Therefore, the lens assembly 1 of the first embodiment is capable of good optical performance.

Referring to FIG. 3, FIG. 3 is a lens layout diagram of a lens assembly in accordance with a second embodiment of the invention. The lens assembly 2 includes a front lens group $LG2_F$, a stop ST2, and a rear lens group $LG2_R$, all of which are arranged in order from an object side to an image side along an optical axis OA2. The front lens group $LG2_F$ includes a first lens L21 and a second lens L22. The rear lens group $LG2_R$ includes a third lens L23 and a fourth lens L24. In operation, an image of light rays from the object side is formed at an image plane IMA2. The lens assembly 2 is a fixed-focus lens assembly, wherein the front lens group $LG2_F$, the stop ST2, and the rear lens group $LG2_R$ can be moved along the optical axis OA2 for focusing.

As described above, wherein: the first lens L21 is a biconvex lens, wherein the object side surface S21 is a convex surface and the image side surface S22 is a convex surface; the second lens L22 is a biconcave lens, wherein the surface profiles of the second lens L22 approximate to that of the second lens L12 of the lens assembly 1 of the first embodiment, and is not described here again; the third lens L23 is a biconvex lens, wherein the object side surface S26 and the image side surface S27 are aspheric surfaces; and the fourth lens L24 is a biconcave lens, wherein the surface profiles of the fourth lens L24 approximate to that of the fourth lens L14 of the lens assembly 1 of the first embodiment, and is not described here again.

With the above design of the lenses and stop ST2 and at least any one of the conditions (1)-(8) satisfied, the lens assembly 2 can have an effective shortened total lens length, an effective reduced weight, an effective increased resolution, an effective corrected chromatic aberration, and is capable of an effective corrected aberration.

Table 4 shows the optical specification of the lens assembly 2 in FIG. 3.

TABLE 4

Effective Focal Length = 7.36 mm F-number = 2.2
Total Lens Length = 10.89 mm Field of View = 46.6 Degrees

| Surface Number | Radius of Curvature (mm) | Thickness (mm) | Nd | Vd | Effective Focal Length (mm) | Remark |
|---|---|---|---|---|---|---|
| S21 | 7.28 | 1.16 | 1.55 | 55 | 12.43 | The First Lens L21 |
| S22 | −105.23 | 0.64 | | | | |
| S23 | −19.08 | 0.49 | 1.66 | 20 | −11.27 | The Second Lens L22 |
| S24 | 12.31 | 2.18 | | | | |
| S25 | ∞ | 0.11 | | | | Stop ST2 |
| S26 | 4.53 | 0.94 | 1.53 | 55 | 5.28 | The Third Lens L23 |
| S27 | −6.80 | 3.95 | | | | |
| S28 | −3.44 | 0.58 | 1.66 | 20 | −5.21 | The Fourth Lens L24 |
| S29 | 91493759.05 | 0.84 | | | | |

The definition of aspheric surface sag z of each aspheric lens in table 4 is the same as that of in Table 1, and is not described here again.

In the second embodiment, the conic constant k and the aspheric coefficients A, B, C, D, E of each aspheric lens are shown in Table 5.

TABLE 5

| Surface Number | k | A | B | C | D | E |
|---|---|---|---|---|---|---|
| S21 | −5.58E+00 | 2.04E−03 | −7.67E−05 | 0.00E+00 | 0.00E+00 | 0.00E+00 |
| S22 | 0.00E+00 | 2.20E−03 | −1.86E−04 | 0.00E+00 | 0.00E+00 | 0.00E+00 |
| S23 | 0.00E+0 | −6.106E−05 | −3.633E−07 | −2.844E−09 | 0.00E+00 | 0.00E+00 |
| S24 | −0.235 | 7.658E−05 | 8.896E−09 | 5.568E−09 | 0.00E+00 | 0.00E+00 |
| S26 | 0.00E+00 | −5.71E−04 | 9.62E−05 | 0.00E+00 | 0.00E+00 | 0.00E+00 |
| S27 | 0.00E+00 | 7.16E−04 | 1.97E−04 | 0.00E+00 | 0.00E+00 | 0.00E+00 |
| S28 | −7.52E−02 | −2.37E−02 | 6.97E−04 | 0.00E+00 | 0.00E+00 | 0.00E+00 |
| S29 | 0.00E+00 | −1.38E−02 | 6.80E−04 | 3.84E−06 | 0.00E+00 | 0.00E+00 |

Table 6 shows the parameters and condition values for conditions (1)-(8) in accordance with the second embodiment of the invention. It can be seen from Table 6 that the lens assembly 2 of the second embodiment satisfies the conditions (1)-(8).

TABLE 6

| $f_F$ | −736 mm | $f_R$ | 6.398 mm | | |
|---|---|---|---|---|---|
| $f + f_1$ | 19.79 mm | $f + f_3$ | 12.64 mm | $f + f_4$ | 2.15 mm |
| $Vd_3 + Vd_4$ | 75 | f/TTL | 0.68 | $|f/f_F|$ | 0.01 |
| $|(f_R - f)/f|$ | 0.13 | $|f_R/f_F|$ | 0.00869 | | |

Figure 4A:
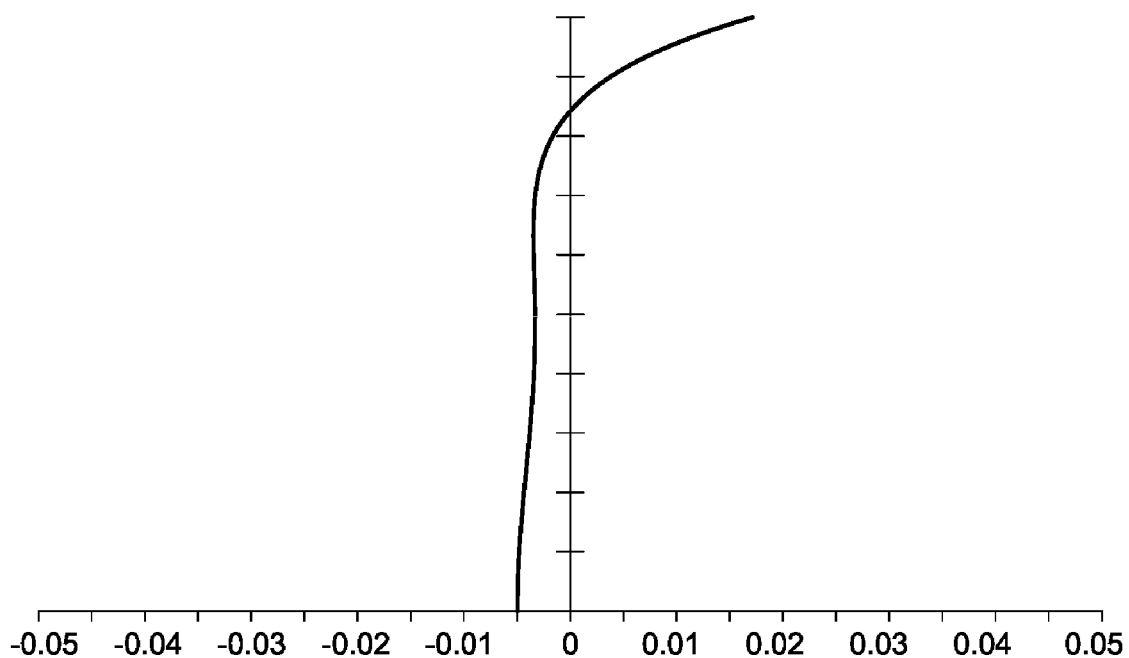
FIG. 4A depicts a longitudinal aberration diagram of the lens assembly in accordance with the second embodiment of the invention.
Figure 4B:
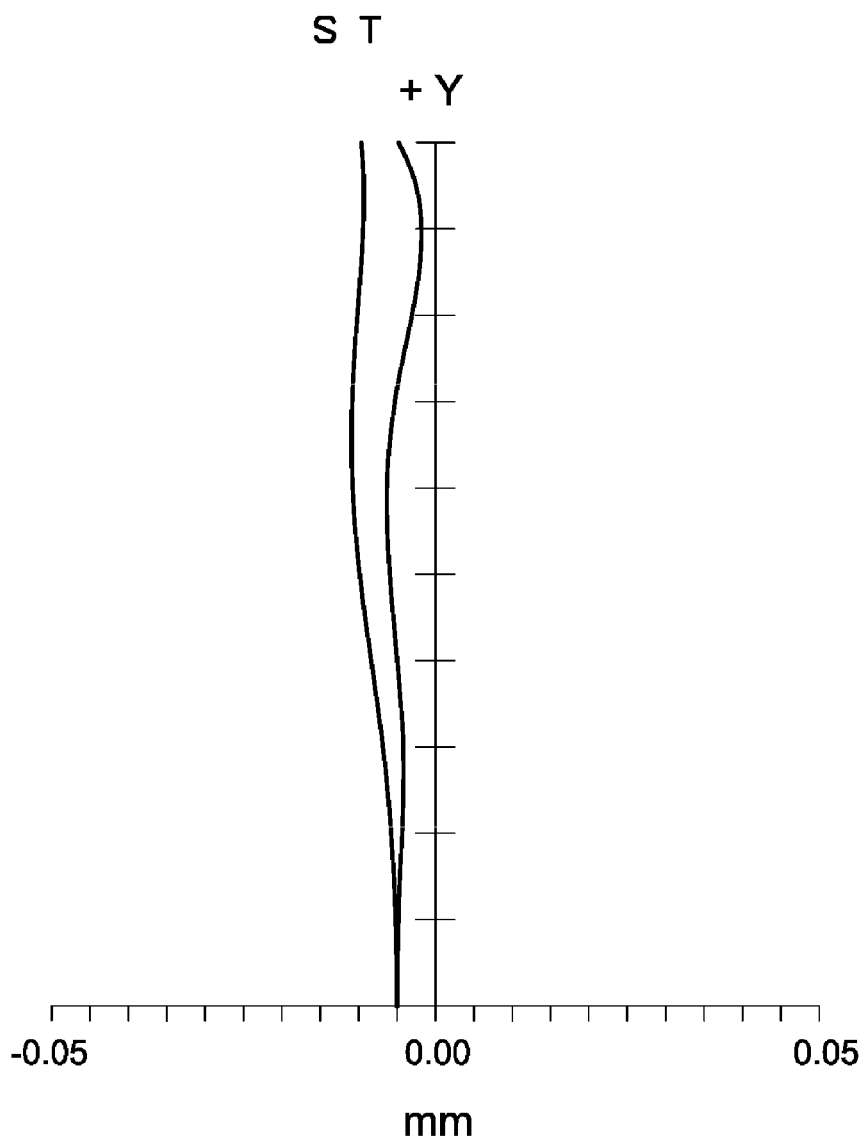
FIG. 4B is a field curvature diagram of the lens assembly in accordance with the second embodiment of the invention.
Figure 4C:
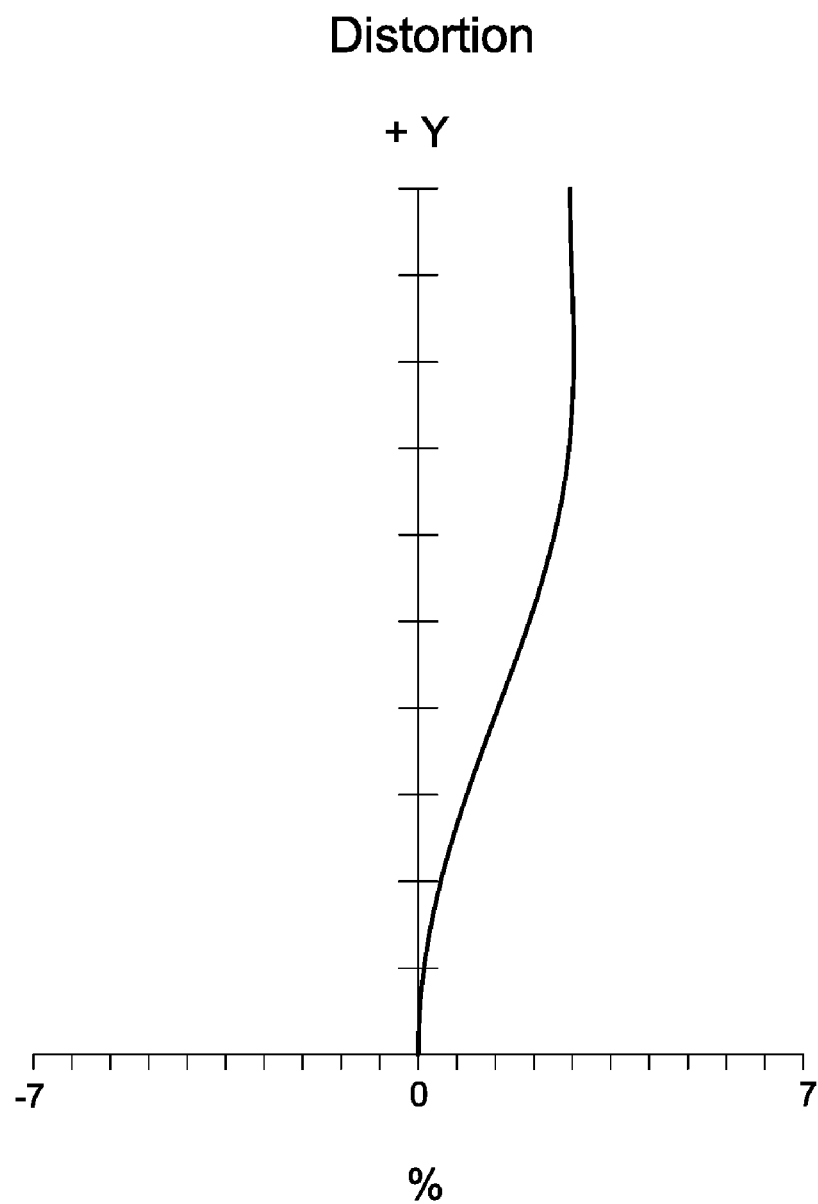
FIG. 4C is a distortion diagram of the lens assembly in accordance with the second embodiment of the invention.

By the above arrangements of the lenses and stop ST2, the lens assembly 2 of the second embodiment can meet the requirements of optical performance as seen in FIGS. 4A-4C.

It can be seen from FIG. 4A that the longitudinal aberration in the lens assembly 2 of the second embodiment ranges from −0.005 mm to 0.02 mm.

It can be seen from FIG. 4B that the field curvature of tangential direction and sagittal direction in the lens assembly 2 of the second embodiment ranges from −0.015 mm to 0.00 mm.

It can be seen from FIG. 4C that the distortion in the lens assembly 2 of the second embodiment ranges from 0% to 2.8%.

It is obvious that the longitudinal aberration, the field curvature, and the distortion of the lens assembly 2 of the second embodiment can be corrected effectively. Therefore, the lens assembly 2 of the second embodiment is capable of good optical performance.

Referring to FIG. 5, FIG. 5 is a lens layout diagram of a lens assembly in accordance with a third embodiment of the invention. The lens assembly 3 includes a front lens group $LG3_F$, a stop ST3, and a rear lens group $LG3_R$, all of which are arranged in order from an object side to an image side along an optical axis OA3. The front lens group $LG3_F$ includes a first lens L31 and a second lens L32. The rear lens group $LG3_R$ includes a third lens L33 and a fourth lens L34. In operation, an image of light rays from the object side is formed at an image plane IMA3. The lens assembly 3 is a fixed-focus lens assembly, wherein the front lens group $LG3_F$, the stop ST3, and the rear lens group $LG3_R$ can be moved along the optical axis OA3 for focusing.

As described above, wherein: the first lens L31 is a biconvex lens, wherein the object side surface S31 is a convex surface and the image side surface S32 is a convex surface; the second lens L32 is a biconcave lens, wherein the surface profiles of the second lens L32 approximate to that of the second lens L12 of the lens assembly 1 of the first embodiment, and is not described here again; the third lens L33 is a biconvex lens, wherein the object side surface S36 and the image side surface S37 are aspheric surfaces; and the fourth lens L34 is a biconcave lens, wherein the surface profiles of the fourth lens L34 approximate to that of the fourth lens L14 of the lens assembly 1 of the first embodiment, and is not described here again.

With the above design of the lenses and stop ST3 and at least any one of the conditions (1)-(8) satisfied, the lens assembly 3 can have an effective shortened total lens length, an effective reduced weight, an effective increased resolution, an effective corrected chromatic aberration, and is capable of an effective corrected aberration.

Table 7 shows the optical specification of the lens assembly 3 in FIG. 5.

TABLE 7

Effective Focal Length = 6.48 mm F-number = 2.4
Total Lens Length = 11 mm Field of View = 52.00 Degrees

| Surface Number | Radius of Curvature (mm) | Thickness (mm) | Nd | Vd | Effective Focal Length (mm) | Remark |
|---|---|---|---|---|---|---|
| S31 | 5.77 | 1.67 | 1.55 | 55 | 7.09 | The First Lens L31 |
| S32 | −10.80 | 0.19 | | | | |
| S33 | −71.89 | 1.50 | 1.66 | 20 | −15.75 | The Second Lens L32 |
| S34 | 12.25 | 0.33 | | | | |
| S35 | ∞ | 0.78 | | | | Stop ST3 |
| S36 | 10.81 | 3.67 | 1.8 | 46 | 3.35 | The Third Lens L33 |
| S37 | −3.03 | 0.57 | | | | |
| S38 | −2.28 | 1.42 | 1.6 | 24 | −2.70 | The Fourth Lens L34 |
| S39 | 6.92 | 0.87 | | | | |

The definition of aspheric surface sag z of each aspheric lens in table 7 is the same as that of in Table 1, and is not described here again.

In the third embodiment, the conic constant k and the aspheric coefficients A, B, C, D, E of each aspheric lens are shown in Table 8.

TABLE 8

| Surface Number | k | A | B | C | D | E |
|---|---|---|---|---|---|---|
| S31 | −7.34E−01 | 1.84E−03 | 3.85E−05 | 0.00E+00 | 0.00E+00 | 0.00E+00 |
| S32 | 0.00E+00 | 2.36E−03 | −2.56E−06 | 1.62E−08 | 0.00E+00 | 0.00E+00 |
| S33 | 0.00E+00 | −4.59E−03 | 6.84E−04 | −4.70E−07 | 0.00E+00 | 0.00E+00 |
| S34 | 7.05E+01 | −7.76E−03 | −5.90E−04 | 0.00E+00 | 0.00E+00 | 0.00E+00 |
| S36 | 0.00E+00 | 0.00E+00 | 0.00E+00 | 0.00E+00 | 0.00E+00 | 0.00E+00 |
| S37 | 0.00E+00 | 0.00E+00 | 0.00E+00 | 0.00E+00 | 0.00E+00 | 0.00E+00 |
| S38 | −1.14E+00 | −3.37E−02 | 3.46E−04 | 8.65E−04 | −1.56E−04 | 0.00E+00 |
| S39 | 0.00E+00 | −1.74E−02 | 1.58E−03 | −7.51E−05 | 0.00E+00 | 0.00E+00 |

Table 9 shows the parameters and condition values for conditions (1)-(8) in accordance with the third embodiment of the invention. It can be seen from Table 9 that the lens assembly 3 of the third embodiment satisfies the conditions (1)-(8).

TABLE 9

| $f_F$ | 12.678 mm | $f_R$ | 14.389 mm | | |
|---|---|---|---|---|---|
| $f + f_1$ | 13.57 mm | $f + f_3$ | 9.83 mm | $f + f_4$ | 3.78 mm |
| $Vd_3 + Vd_4$ | 70 | f/TTL | 0.59 | $|f/f_F|$ | 0.51 |
| $|(f_R - f)/f|$ | 1.22 | $|f_R/f_F|$ | 1.13 | | |

Figure 6A:
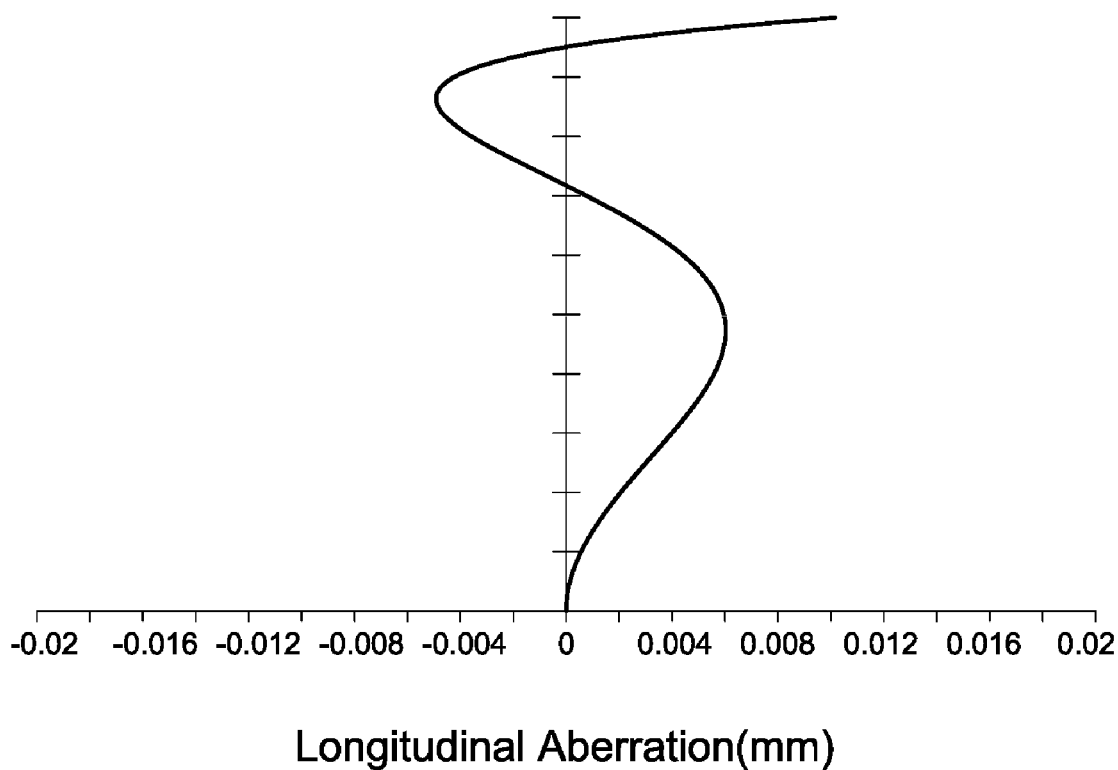
FIG. 6A depicts a longitudinal aberration diagram of the lens assembly in accordance with the third embodiment of the invention.
Figure 6B:
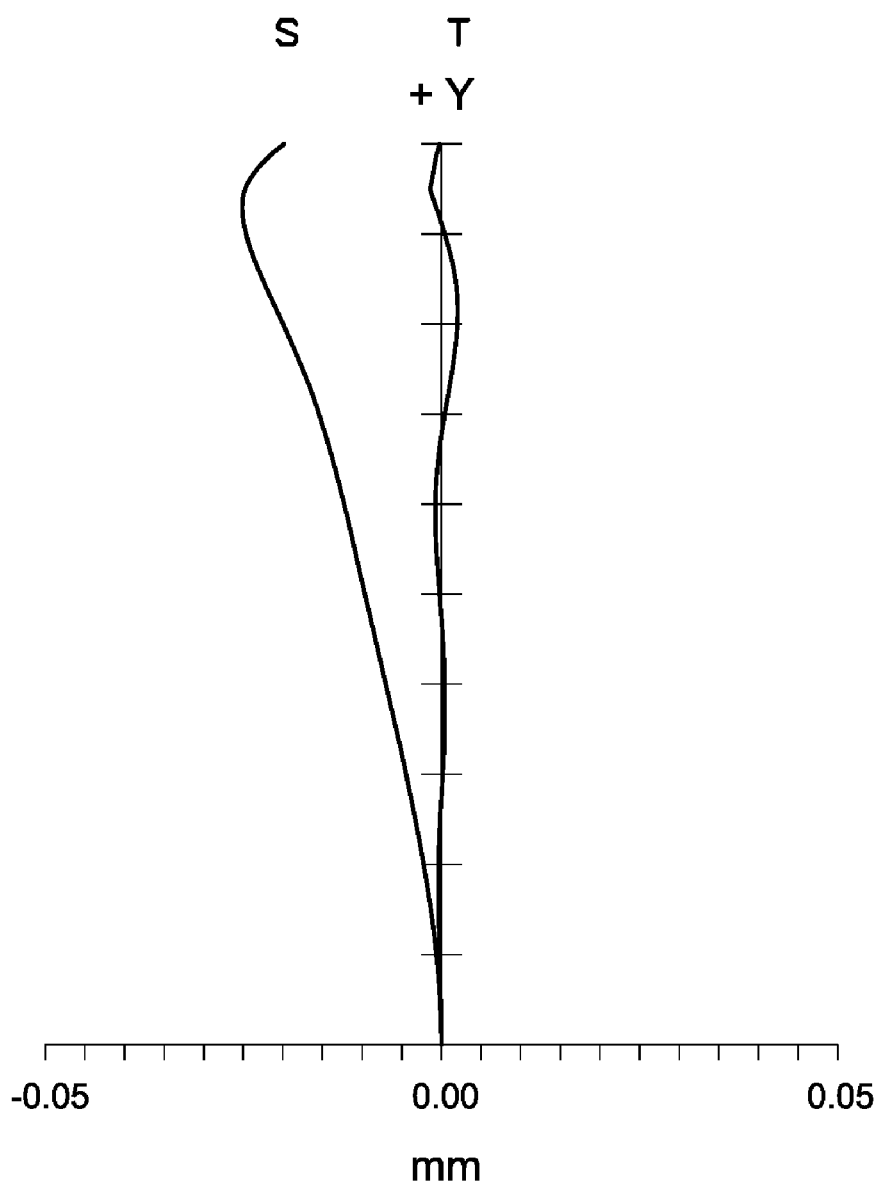
FIG. 6B is a field curvature diagram of the lens assembly in accordance with the third embodiment of the invention.
Figure 6C:
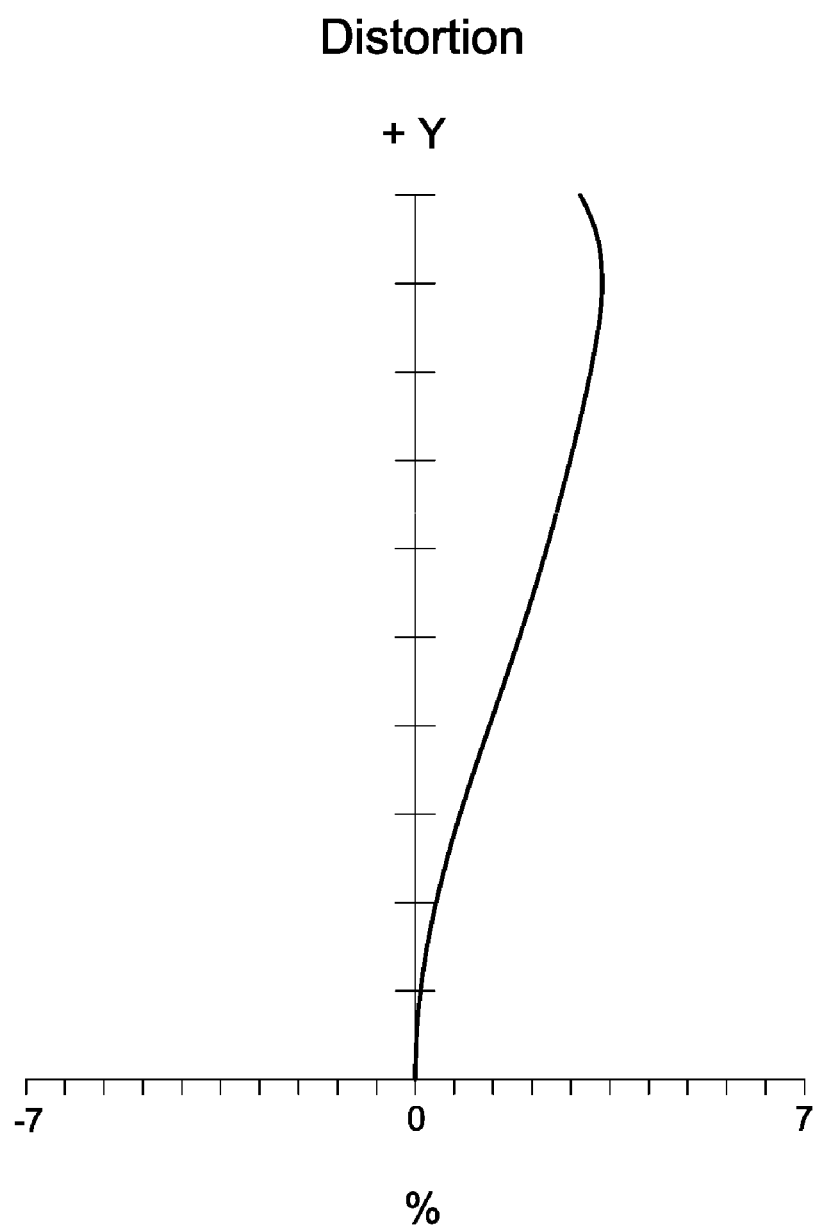
FIG. 6C is a distortion diagram of the lens assembly in accordance with the third embodiment of the invention.

By the above arrangements of the lenses and stop ST3, the lens assembly 3 of the third embodiment can meet the requirements of optical performance as seen in FIGS. 6A-6C.

It can be seen from FIG. 6A that the longitudinal aberration in the lens assembly 3 of the third embodiment ranges from −0.006 mm to 0.010 mm.

It can be seen from FIG. 6B that the field curvature of tangential direction and sagittal direction in the lens assembly 3 of the third embodiment ranges from −0.03 mm to 0.005 mm.

It can be seen from FIG. 6C that the distortion in the lens assembly 3 of the third embodiment ranges from 0% to 3.5%.

It is obvious that the longitudinal aberration, the field curvature, and the distortion of the lens assembly 3 of the third embodiment can be corrected effectively. Therefore, the lens assembly 3 of the third embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:
   a front lens group; and
   a rear lens group;
   wherein the front lens group comprises a first lens having positive refractive power and a second lens having negative refractive power;
   wherein the rear lens group comprises a third lens having positive refractive power and a fourth lens having negative refractive power, wherein the third lens comprises a convex surface facing an object side and another convex surface facing an image side and the fourth lens comprises a concave surface facing the object side and a concave surface facing the image side;
   wherein the first lens, the second lens, the third lens, and the fourth lens are arranged in order from the object side to the image side along an optical axis;
   wherein the lens assembly satisfies:

$$13.5 \text{ mm} \leq f + f_1 < 20 \text{ mm};$$

wherein f is an effective focal length of the lens assembly and $f_1$ is an effective focal length of the first lens.

2. The lens assembly as claimed in claim 1, wherein the lens assembly satisfies:

$$9.5 \text{ mm} \leq f + f_3 < 13 \text{ mm};$$

$$2 \text{ mm} \leq f + f_4 < 4 \text{ mm};$$

wherein f is an effective focal length of the lens assembly, $f_3$ is an effective focal length of the third lens, and $f_4$ is an effective focal length of the fourth lens.

3. The lens assembly as claimed in claim 1, wherein the lens assembly satisfies:

$$60 < Vd_3 + Vd_4 < 80;$$

$$0.5 < f/TTL < 0.8;$$

wherein $Vd_3$ is an Abbe number of the third lens, $Vd_4$ is an Abbe number of the fourth lens, f is an effective focal length of the lens assembly, and TTL is an interval from an object side surface of the first lens to an image plane along the optical axis.

4. The lens assembly as claimed in claim 1, wherein the lens assembly satisfies:

$0.1<|f/f_F|<0.6;$ $0.2<|(f_R-f)/f|<1.5;$ wherein f is an effective focal length of the lens assembly, $f_F$ is an effective focal length of the front lens group, and $f_R$ is an effective focal length of the rear lens group.

5. The lens assembly as claimed in claim 1, wherein the lens assembly satisfies:

$0.1<f_n/f_F<1.5;$ wherein $f_F$ is an effective focal length of the front lens group and $f_R$ is an effective focal length of the rear lens group.

6. The lens assembly as claimed in claim 1, further comprising a stop disposed between the front lens group and the rear lens group, and the lens assembly is a fixed-focus lens assembly.

7. The lens assembly as claimed in claim 1, wherein:
the second lens comprises a concave surface facing the object side and another concave surface facing the image side.

8. The lens assembly as claimed in claim 7, wherein:
the first lens comprises a convex surface facing the object side and another convex surface facing the image side.

9. The lens assembly as claimed in claim 7, wherein:
the first lens comprises a convex surface facing the object side and a concave surface facing the image side.

10. The lens assembly as claimed in claim 8, wherein the front lens group comprises an aspheric lens and the rear lens group comprises an aspheric lens.

11. The lens assembly as claimed in claim 9, wherein the lens assembly satisfies:

$0.5<f/TTL<0.8;$ $0.1<f/f_F<0.6;$ $0.2<|(f_R-f)/f|<1.5;$ $0.1<f_n/f_F<1.5;$ wherein f is an effective focal length of the lens assembly, $f_F$ is an effective focal length of the front lens group, $f_R$ is an effective focal length of the rear lens group, and TTL is an interval from the convex surface of the first lens to an image plane along the optical axis.

12. A lens assembly comprising:
a front lens group; and
a rear lens group;
wherein the front lens group comprises a first lens having positive refractive power and a second lens having negative refractive power;
wherein the rear lens group comprises a third lens having positive refractive power and a fourth lens having negative refractive power, wherein the third lens comprises a convex surface facing an object side and another convex surface facing an image side and the fourth lens comprises a concave surface facing the image side;
wherein the first lens, the second lens, the third lens, and the fourth lens are arranged in order from the object side to the image side along an optical axis;
wherein the lens assembly satisfies:

$60<Vd_3+Vd_4<80;$ wherein $Vd_3$ is an Abbe number of the third lens and $Vd_4$ is an Abbe number of the fourth lens.

13. The lens assembly as claimed in claim 12, wherein the lens assembly satisfies:

$9.5\ mm<f+f_3<13\ mm;$ $2\ mm<f+f_4<4\ mm;$ wherein f is an effective focal length of the lens assembly, $f_3$ is an effective focal length of the third lens, and $f_4$ is an effective focal length of the fourth lens.

14. The lens assembly as claimed in claim 12, wherein the lens assembly satisfies:

$0.5<f/TTL<0.8;$ $0.1<f/f_F<0.6;$ $0.2<|(f_R-f)/f|<1.5;$ $0.1<f_n/f_F<1.5;$ wherein f is an effective focal length of the lens assembly, $f_F$ is an effective focal length of the front lens group, $f_R$ is an effective focal length of the rear lens group, and TTL is an interval from an object side surface of the first lens to an image plane along the optical axis.

15. The lens assembly as claimed in claim 12, wherein the front lens group comprises an aspheric lens and the rear lens group comprises an aspheric lens.

16. The lens assembly as claimed in claim 12, wherein:
the first lens comprises a convex surface facing the object side and a concave surface facing the image side;
the second lens comprises a concave surface facing the object side and another concave surface facing the image side; and
the fourth lens further comprises a concave surface facing the object side.

17. The lens assembly as claimed in claim 12, wherein:
the first lens comprises a convex surface facing the object side and another convex surface facing the image side;
the second lens comprises a concave surface facing the object side and another concave surface facing the image side; and
the fourth lens further comprises a concave surface facing the object side.

18. The lens assembly as claimed in claim 12, further comprising a stop disposed between the front lens group and the rear lens group, and the lens assembly is a fixed-focus lens assembly.

19. A lens assembly comprising:
a front lens group; and
a rear lens group;
wherein the front lens group comprises a first lens having positive refractive power and a second lens having negative refractive power;
wherein the rear lens group comprises a third lens having positive refractive power and a fourth lens having negative refractive power, wherein the third lens comprises a convex surface facing an object side and another convex surface facing an image side and the fourth lens comprises a concave surface facing the image side;
wherein the first lens, the second lens, the third lens, and the fourth lens are arranged in order from the object side to the image side along an optical axis;
wherein the lens assembly satisfies:

$13.5\ mm<f+f_1<20\ mm;$ wherein f is an effective focal length of the lens assembly and $f_1$ is an effective focal length of the first lens;

wherein the lens assembly satisfies at least one of following conditions:

$$9.5 \text{ mm} < f+f_3 < 13 \text{ mm};$$

$$60 < Vd_3 + Vd_4 < 80;$$

wherein f is the effective focal length of the lens assembly, $f_3$ is an effective focal length of the third lens, $Vd_3$ is an Abbe number of the third lens, and $Vd_4$ is an Abbe number of the fourth lens.

* * * * *